R. J. WOODWARD.
BOLSTER FOR VEHICLES.
APPLICATION FILED SEPT. 11, 1911.

1,022,913.

Patented Apr. 9, 1912.

WITNESSES:
Marian Albertson
Geo E Machen

INVENTOR
Roy J. Woodward
BY
Francis C Huebner
ATTORNEY

COLUMBIA PLANOGRAPH CO., WASHINGTON, D. C.

ure 1 shows a front view of the
UNITED STATES PATENT OFFICE.

ROY J. WOODWARD, OF FRESNO, CALIFORNIA.

BOLSTER FOR VEHICLES.

1,022,913.  Specification of Letters Patent.  Patented Apr. 9, 1912.

Application filed September 11, 1911. Serial No. 648,822.

*To all whom it may concern:*

Be it known that I, ROY J. WOODWARD, of the city of Fresno, county of Fresno, and State of California, have invented a new and useful Improvement in Bolsters for Vehicles, of which the following is a specification.

Figure 1:
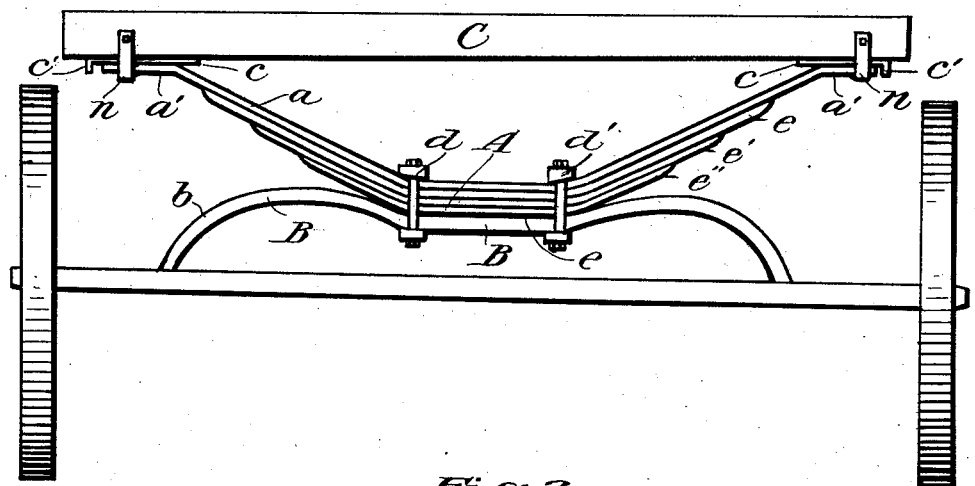
Figure 2:
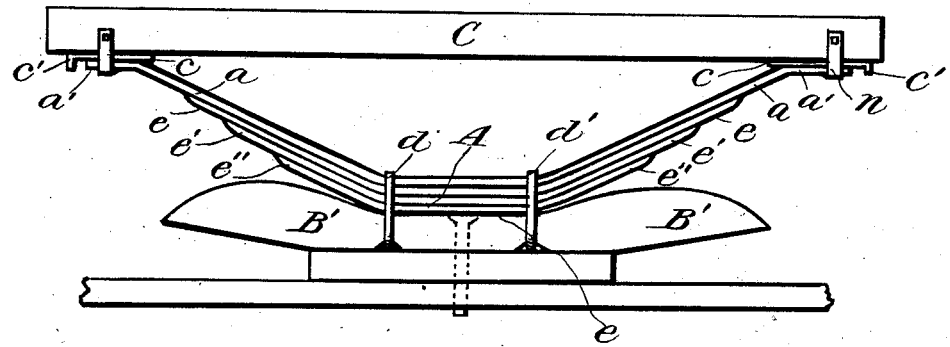
Figure 3:

My invention relates to a combination bolster and spring for use on trucks, wagons and other vehicles, and in the accompanying drawing Figure 1 shows a front view of the bolster as used on the back axle of a truck or vehicle, Fig. 2 shows a front view of the bolster as used on the front axle of a wagon or vehicle, and Fig. 3 is a side view of a portion of the bolster showing the end thereof bent vertically upward.

In said drawings A is the spring which is substituted in my inventon for the ordinary rigid bolster and which is hereinafter referred to as bolster A. The form of bolster A can be semi elliptical. In my construction, however, I prefer to have the ends of bolster A bent obliquely upward from a common horizontal base. Bolster A consists of a spring leaf $a$ bent as above described and at or near the end bent to form a rest $a'$, the plane of which is parallel with the plane of base $e$. Leaf $a$ may terminate at either end with a perpendicular extension shown in Fig. 3 as $a''$. Leaf $a$ may be strengthened by additional leaves $e$, $e'$ and $e''$ which may be bolted or clamped at or near the center to leaf $a$.

B is a rigid support having a horizontal plane $e$ in the center and upper side thereof conforming with the base of bolster A, and to which it is firmly clamped at either end of said plane $e$ by means of clamps $d$ and $d'$. On either side of clamps $d$ and $d'$ support B extends approximately the length of bolster A and describes a curve having the convex surface upward, a part of such convex surface rising slightly above the plane of base $e$. The space between the oblique extension of bolster A and the curved extension of support B on the same side, increases outward from the points where said bolster A and support B are clamped together. The object of this construction is to form a rigid support for bolster A when depressed by an unusual load or jar. The heavier the load and the more bolster A is depressed, the longer will be the plane of contact of bolster A with support B, thus making the arms of the spring composing bolster A shorter and stronger, and capable of carrying much larger loads than would be possible without such support. Support B may be firmly fastened to the axle of the wagon as shown in Fig. 1, or it may form the upper part of the turntable B' as shown in Fig. 2.

Beam C rests on the top of bolster A. In using the construction of bolster shown in Fig. 1, where either end terminates with a horizontal rest, the ends $a'$ of bolster A work in slides $n$ suspended from either end of beam C, and a flat piece of metal $c$ bent in the form of a right angle is fastened to the under side and at either end of beam C where ends $a'$ of bolster A come in contact with beam C. The object of this construction is to reduce the wear where the ends of bolster A rub on beam C. The extension $c'$, which is a perpendicular drop from the outside end of plate $c$, is for the purpose of preventing bolster A from slipping too far from either end of beam C. If bolster A is constructed as shown in Fig. 3, having an upright extension at the extreme end thereof shown as $a''$, the extension $c'$ on plate $c$ can be dispensed with. A platform can be placed on beam C or substituted for it.

What I claim as my invention and upon which I ask for Letters Patent are:

The combination of a bolster constructed of an elongated spring having a horizontal base with arms extending obliquely upward therefrom fastened to a support having a horizontal surface corresponding with the base of said bolster, such support having extensions on either side of such horizontal surface curved with the convex surface upward, and a space between such curved extension and the oblique arms of the bolster which increases outwardly from the point of contact of such bolster and such support, all substantially as described.

ROY J. WOODWARD.

Witnesses:
EDWIN BISHOP,
H. L. ALDRICH.

---

Copies of this patent may be obtained for five cents each, by addressing the "Commissioner of Patents, Washington, D. C."